Feb. 20, 1923.

H. F. BLACKWELL 1,446,113

PLANT PROPAGATION CELL OR CONTAINER

Filed Sept. 22, 1921

Inventor:
Henry F. Blackwell,
By his Attorney,

Patented Feb. 20, 1923.

1,446,113

UNITED STATES PATENT OFFICE.

HENRY F. BLACKWELL, OF HIGHLAND, NEW YORK, ASSIGNOR TO MAUDE A. BLACKWELL, OF HIGHLAND, NEW YORK.

PLANT-PROPAGATION CELL OR CONTAINER.

Application filed September 22, 1921. Serial No. 502,395.

*To all whom it may concern:*

Be it known that I, HENRY F. BLACKWELL, a citizen of the United States, and a resident of Highland, Ulster County, State of New York, have invented a new and useful Plant-Propagation Cell or Container, of which the following is a specification.

While applicable to the propagation and growth of plants generally, my invention is designed more especially to provide containing means that will aid and facilitate the germination of spores, seeds, bulbs, etc., in embryo, and also the preliminary growth therefrom, as well as from cuttings or slips, and of young plants, substantially in the manner and for the purposes hereinafter more fully set forth,—the invention consisting primarily and essentially in a container-cell formed of a combination of elements consisting of a composition comprising a moisture retaining substance, a plant food or "fertilizer," and a binder.

Vegetable matter in the soil, in the process of disintegration, is known as humus; as also is the vegetable matter still in cellular form occurring in stable manure, peat, leaf mould, straw, weed stems, etc. The latter substances are further differentiated by the term raw humus.

This vegetable matter or raw humus is acted upon by the elements slowly and by bacilli rapidly, and converted into humogen and other compounds of a colloidal character; among which are several acids; and is the preferred moisture retaining element used in my concretion. In this decomposed vegetable matter organized cellulose is disintegrated more or less completely, and consists of some plant cells, a large proportion of carbonaceous matter, a quantity of nitrogen in combined form, usually about 4%, and a number of vegetable or colloidal acids and compounds more or less known,—the carbonaceous material and nitrogen being adapted to contribute to plant development. The humogen is spongy, and when damp will easily retain from 50% to 70% of its weight of water. The acids, particularly the humic acid, also act upon the uncombined phosphate of calcium, nitrogen, potash, and other elements, in the commercial fertilizers used, and herein designated as the plant food element of my agglomeration, thereby adapting said plant fertilizer food for plant assimilation in the form of humates.

The acids resulting from the disintegration of raw humus are a condition of substance transitional to an ultimate form; for instance: humic acid is transitional to the form of humin; just as pectic acid is transitional to pectin; and is most valuable to my purpose in its nascent form in the presence of a suitable base. Thus, the acids, particularly the humic acid, attack and combine with the nitrogen, calcium, potassium and other bases, either alone or in combination with phosphoric acid, forming in the one case humates and in the other phosphohumates of the elements.

As these salts of humic acid are for the greater part soluble, the humogen is best for the purpose described when prepared by bacterial action on raw humus and protected from the leaching effects of rains, etc.

Mixtures of humus of various kinds, presenting desired bases, as lime, iron, sulphur, ammonia, etc., may be made; and when inoculated with suitable bacteria for the development of humic acid, salts of that acid are formed directly; and if the so-called "nitrogen-fixing" bacteria are used ammonium humate is formed and as such are "available" or in condition for ready assimilation by the plant; exactly as the human system readily assimilates the compounds of peptic acid in the forms of peptones and peptonates.

As above intimated, I use the term plant food element as designating the constituents of commercial fertilizers generally, commonly comprising nitrogen, phosphoric acid and potash combined with various substances, some of which are inert, some detrimental, and some beneficial to plant development. These commercial fertilizers are classified in accordance with the percentages of these substances which they contain in uncombined form. For instance a plant food suitable for my purpose is known commercially as 4—10—3, and contains 4% of nitrogen, 10% of phosphoric acid, and 3% of potash.

The binding element used to unite the moisture retaining element to the plant food element may consist of any suitable hardening or setting material not deleterious to plant growth. A preferred form of binder for my purpose is one in which casein is used,—that substance containing hydrogen 7%, carbon 53%, nitrogen 16%, sulphur 1%, phosphorus 1%, oxygen 22%. The casein is obtained from pot-cheese by washing out the soluble ingredients, and is used in combination with slaked lime (calcium hydrate). When casein 16 parts and slaked lime 20 parts are kneaded together with a small amount of water, a sticky glue-like mass results, which may be further diluted and added to the powdered humogen and plant food, when the whole admixture may be kneaded into a homogeneous mass and pressed into form.

Sodium silicate may be used to replace the water in the cheese-lime mass with good results, the silica lending elasticity and toughness to the woody parts of the plant in its later growth.

Calcium oxychloride, prepared by combining calcium oxide, (quick lime) with calcium chloride, in solution, and adding sodium silicate, produces a double decomposition resulting in the precipitation of pure silica crystals (quartz).

The liberation of sodium or potassium from any of its salts, which occur in the fertilizers or binding materials exercise a partial solvent action, particularly in presence of sulphur, upon the cellulose, changing it into viscol, a glue like material, valuable as a binder, but occuring in small quantities.

Viscol (cellulose sulphate) alone would make an admirable binder, but its cost is prohibitive.

In the accompanying drawings, by way of exemplification, I illustrate forms of containers which may be used in the practical application of my invention, although I do not limit myself in this respect, the specific configuration of my container being secondary to the composition employed in its manufacture, so that various modifications may be resorted to without departing from the spirit and intent of my invention, which contemplates, broadly, a cell or container composed of a moisture retaining element, a plant food element, and a binder, whereby the container is adapted to the purposes designated.

With this understanding, Fig. 1, is a perspective view of a container adapted for general use as a receptacle for a seedling, bulb, cutting, or plant;

Figure 1:
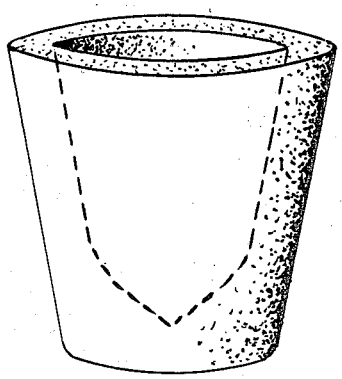

The container illustrated in Fig. 1, is designed more particularly for potted plants, and is made with relatively thin side walls and with a relatively thick bottom. The cavity for the soil and plant is of inverted convergent conoidal shape, as indicated by dotted lines in said figure, to facilitate drainage by filtration. This form of container is intended to fit inside of a common flower pot, or similar receptacle, the intervening space, if any, being filled with dry sand.

Figure 2:
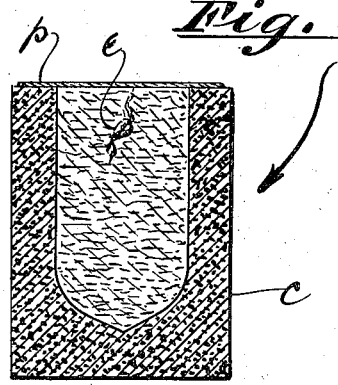
Fig. 2, is a vertical central section of a cell adapted for seed or spore germination.

Fig. 2, illustrates the use of an initiating propagation cell in which the seed or similar incipient embryo is embedded in dry soil $s$, positioned in the cavity of the container. By closing the mouth of the charged container by means of a paper $p$, or other suitable seal, as indicated in this figure, a commercial commodity is produced, adapted for planting, as required.

Figure 3:
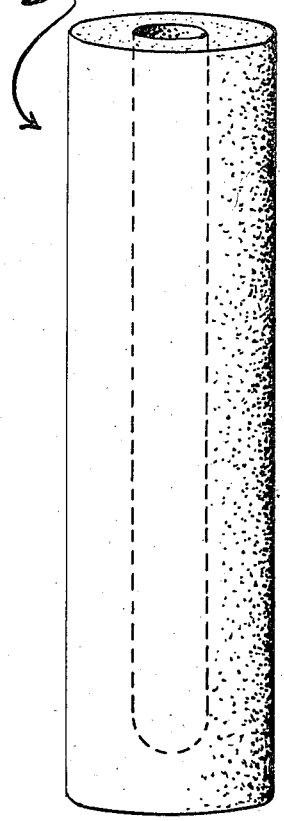
Fig. 3, is a perspective view of an elongate container adapted to grape-vine propagation from cuttings, and analogous purposes.

The form of container illustrated in Fig. 3 is designed more especially for starting the growth of cuttings, such as grape vine and cuttings generally. Grape cuttings particularly average considerable distance between "eyes", and as it is desirable to have two eyes below the soil surface, this form of container is made long, and with a deep cavity as indicated by dotted lines.

Figure 4:
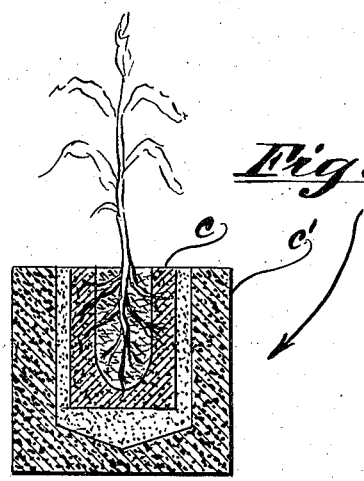
Fig. 4, is a sectional view illustrating, an adaptation of my invention to the transplanting of sprouts or plants of incipient growth.

In Fig. 4, an initiating seed-propagating cell $c$, such as shown in Fig. 2, is shown as transferred to a larger propagating cell $c'$, after the seed has sprouted and the roots have penetrated such primary cell $c$. The young plants may be thus transferred and transplanted without disturbing the roots or retarding the growth of the plant.

In the manufacture of the various forms of my plant propagation container, the first essential in the solidification of humogen, is to reduce it to a finely divided condition. This may be done, either dry, with suitable dust collectors, or wet with a small stream of water flowing through the mill, which should preferably be equipped with old-fashioned buhr stones. There is a fire and explosion hazard incident to the dry grinding method, and the wet method requires precipitant and settling tanks. Both methods require about the same amount of manual labor.

The dry grinding method is best suited to treating swamp humogen, resulting from the oxidation of vegetable matter, in the form of peat; while the wet grinding method is best suited to that humogen received from pond and lake bottoms as the animal matter contained in the "ooze" is conserved in the settling tanks, where alum is used in quantities to precipitate the flocculous vegetable matter. The strongly astringent qualities of alum harden the albuminoids of the animal organisms, and these are precipitated with the humogen, augmenting the nitrogen content.

The humogen pulp, either wet or dry, must next be compounded into a plastic mass; the addition of plant food to agree with formula requirements, and proper agglutinants, to bind the pulp into a tenacious dough that will harden on drying, or set hard before drying.

The addition of a small amount of calcium hydrate (slaked lime) and potassium hydrate (caustic potash) will cause the humogen mass to harden upon drying, probably because of the solvent action of the two caustics upon the partially broken down cellulose.

Carbon disulphide gas as a pre-treatment, might enable the caustic alkalis to viscolize the undestroyed cellulose, and at the same time add sulphur to the mass.

The action of the precipitant (alum) upon the animal matter contained in the "ooze" will harden the mass upon drying. This is augmented by the addition of a few per cent of sodium silicate (water glass).

The compound of casein and calcium hydrate (case-lime) with sodium silicate, yields a very sticky agglutinant that sets before drying.

Calcium oxychloride, with or without the addition of sodium silicate, sets before drying.

Dextrin, starch, flour and similar agglutinants used in briquetting powdered fuel, may be used; provided only that oils, tars, resins, and allied substances are omitted. The agglutinant should contribute to the feeding of the plant; should bind the material into a strong hard mass; should yield gradually to the combined action of the plant roots, warmth, moisture, reagents and bacteria; but should keep hard and firm while in contact with air; it should not soften in a humid atmosphere through hygroscopic moisture.

To arrive at a clear understanding of the practical value of my system of plant propagation, it will be necessary to describe and consider the practice of plant culture as heretofore known in the art. Briefly, the current practice of plant propagation, taking as example such plants as peppers, tomatoes and cabbages, consists in sowing the seed in drills in the greenhouse. When the plants show four leaves, they are thinned out until they stand two inches apart. The plants removed are sometimes reset or "pricked" out in another place. This operation disturbs the root systems of the plants remaining in the drills as well as those reset, stopping the growth for about five days. When the plants are three inches high, they are transplanted into a cold frame, and when necessary covered with hot-bed sash, to harden.

This transplanting again disturbs the roots, and the growth is checked for another five or six days. Finally, the plants are set out in the field or garden prepared for them with a third disturbance of the roots, and about one week's stoppage of growth. In all under the current method of propagation and planting, plants are set back from two to three weeks in their development. This is an important matter where early fruiting and long seasons are essential for profit to the grower.

My method of cell propagation saves this loss of time in plant development, and also saves the labor of two men and a team, together with the cost of fertilizing material in "spotting" the hills, and the cost of the labor of working the fertilizing material into the soil at each hill, before the plants are set out in the field.

At the time of setting out plants in the field, it is the custom to stop planting if the ground is drying too rapidly owing to the sun's intense heat; ideal weather for such purpose being "overcast or drizzling" with the soil moist. The young plants wilt rapidly and soon die in the dry soil. This necessitates replacing the plants.

All of this unnecessary labor and expense is avoided by my system, as each plant is set out in its own cell or container, which is equivalent to a ball of earth around the roots, and contains sufficient moisture and plant nourishment for its protection till the night dews replenish the soils moisture. Hence, resets are largely obviated.

Among the uses of my invention is the propagation of plants and bulbs from seed. The container for this use is a small cup about two and one half inches high, one and three quarters inches in diameter, and with a conical cavity three quarters of an inch in diameter, reaching to about one eighth inch of the bottom, substantially as shown in Fig. 2, of the drawings. The composite material of which the cell is composed is yieldable to the combined actions of soil bacilli, moisture, and the plants roots,—thus becoming available for plant nourishment.

My propagative containers are of value to truck growers, who raise their own plants, while wholesale growers of plants, and florists, will find a very broad field of application for them in the sale of growing plants.

The containers for the propagation of cuttings are made relatively deep, and of small diameter, to include at least two buds of the cutting.

My propagating cells will be found of value in the production of rapidly growing plants like lettuce, and may be made of a compound that will force the foliage and retard the seed development. This will enable the grower to market growing vegetables.

To summarize, my containers may be advantageously used to propagate plants from seeds; to propagate plants from cuttings; to transplant or repot plants; to develop seedlings for budding; to investigate plant development; and to develop novelties from cross pollination; to market growing plants; and for various other utilitarian purposes.

It is obvious that the formulæ herein set forth for the manufacture of my containers may be varied to an almost indefinite extent by the addition of other materials adapted to produce various effects on the growing plant, so that I do not restrict my invention in this particular, the indispensables being the moisture conserving element, the plant food element, and the binding element, all three in homogeneous concreteness, irrespective of the presence of other ingredients included therewith for specific purposes of plant treatment.

What I claim as my invention and desire to secure by Letters Patent is,

1. As an article of manufacture, a container of the character designated for plant propagation, composed of a moisture conserving element, solidified by a binding element, substantially in the manner and for the purpose described.

2. As an article of manufacture, a container of the character designated for plant propagation, composed of a moisture conserving element, a plant food element, and a binding element, substantially in the manner and for the purpose described.

3. As an article of manufacture, a container designed for plant propagation composed of a moisture conserving element, solidified by a binding element, and a plant food element and given permanent shape.

HENRY F. BLACKWELL.

Witnesses:
 GEO. WM. MIATT,
 DOROTHY MIATT.